United States Patent Office 3,533,976
Patented Oct. 13, 1970

3,533,976
POLYOLEFIN BLENDS WITH SUPERIOR STRESS
CRACK RESISTANCE
Richard A. L. Eidman, Wilmington, Del., assignor to E. I.
du Pont de Nemours and Company, Wilmington, Del.,
a corporation of Delaware
No Drawing. Filed Feb. 9, 1967, Ser. No. 614,818
Int. Cl. C08f 29/12, 45/52
U.S. Cl. 260—28.5
8 Claims

ABSTRACT OF THE DISCLOSURE

A composition of polyethylene resin, ethylene/vinyl acetate copolymer, synthetic paraffin wax, antioxidant and carbon black for use as a good cable jacketing material.

---

This invention relates to compositions which have superior environmental stress cracking resistance, a rheology number in the range of about 120 to 180, and good low temperature brittleness. More particularly, this invention relates to a composition comprising polyethylene resin, an ethylene vinyl acetate copolymer, a synthetic paraffin wax, carbon black and an antioxidant. This composition is especially useful for cable jacketing.

Using a wax to improve extrusion capabilities is known in the art as is shown by U.S. Pats. 2,448,799 and 2,953,541.

The base resin for the cable jacketing composition is a polyethylene resin. Polyethylene resin desirable for use in this invention may be produced in a tubular reactor or a stirred autoclave. A desired method is more particularly described in U.S. Pat. 2,897,183. The polyethylene resin may be a homopolymer of ethylene, or contain telogenic amounts of such units as methane, ethane, or propane, or the polyethylene resin may contain up to about 2 mol percent propylene. About 76% to 92% by wt. of the composition may be the base resin. However the range from 80% to 87% is preferable. The density of the base resin must be in the range of 0.914 to 0.921. Melt index for the base resin must be in the range of 0.1 to 1.0 dg./min.

The ethylene/vinyl acetate copolymer component comprises about 7% to 15% by weight of the composition. (A typical process for preparing ethylene/vinyl acetate copolymer is described in British Pat. 582,093.) However, the best composition contains 10% to 12% ethylene/vinyl acetate copolymer. The ethylene/vinyl acetate copolymer must contain at least 22% to 40% by weight vinyl acetate and preferably about 25% to 35%. At levels above 40% vinyl acetate, the compositions are undesirably soft and lack resistance to abrasion and solvents. The melt index range for the ethylene/vinyl acetate copolymer is 0.2 to 60 with 5 to 20 being preferred.

Synthetic paraffin wax comprises 1% to 5% by weight of the composition. A range from 2% to 4% is preferred, however. The melting point of a desired wax may be from 40° C. to as high as 70° C., but the preferable range is 50° C. A preferred paraffin wax melts at 126° F. as measured by ASTM D-87 (about 52° C.) and is presently sold commercially by the Sun Oil Company as Sunoco 3425. The oil content of this wax is 0.4% with a Saybolt color of +29. Odor and taste are nil. Specific gravity at 60° F. (about 16° C.) is 0.906. Specific gravity of the wax at 212° F. is 0.760.

The composition also contains stabilizing amounts of carbon black and antioxidant. Usually, carbon black is added in the amount of 1% to 5% by weight of the composition, with 2% to 3% by weight being preferred. Finely divided carbon black such as channel black is preferred. The average particle size of such carbon black is about 15 to 25 millimicrons. The amount of antioxidant required to stabilize the composition will, of course, depend upon the particular antioxidant employed, however, the usual concentration will be between 0.01% by weight and 0.5% by weight, and when using the preferred class of stabilizers, namely bis phenol stabilizers, stabilizer concentration usually varies from 0.05% to 0.2% by weight. Such preferred stabilizers include 4,4'-thiobis-(2-tert-butyl 5-methyl phenol), 2,2'-thiobis-(4-methyl-6-tert butyl phenol), and 1,1'-thiobis-(2 naphthol).

The composition may also contain minor amounts of inert fillers, tracers such as metallic salts to aid in identification of product source, and other conventional additives that do not substantially alter its unique properties.

The composition is a blend having a melt index broadly in the range of 0.2 to 1.0 at 190° C., as measured by ASTM D-1238 (Cond. E) and a density of 0.929 to 0.942 as measured by ASTM D-792. A preferable blend has a melt index of 0.2 to 0.6 and a density of 0.936 to 0.942. The blend rheology number ranges from 120 to 180 with 160 preferred. The low temperature brittleness at −76° C. is good.

The blend has a superior stress crack resistance as measured by the test described herein. This environmental stress crack resistance (ESCR) test was designed to screen out materials that would pass the ASTM D-1693-60T stress crack resistance test, but might fail when processed to a cable jacket. In this ESCR test, a Brabender Plasticorder® equipped with measuring head, Type 5 roller blade (C. W. Brabender Instruments, Inc., S. Hackensack, N.J.), processes the blend at a rotor speed of 125 revolutions per minute and circulating oil bath temperature of 200° C. for two hours. Orientation is minimal in such a test, in which the sample undergoes strenuous mechanical shearing action to determine its resistance to processing degradation.

The blend having the components described herein, passes the stress crack resistance test ASTM D-1693-60T after it has been processed as described, in a Brabender Plasticorder®, with the following modifications.

(1) Step 8 calling for conditioning in boiling water at 100° C. for one hour is omitted; instead, the molded plaque is annealed in a 70° C. circulating air oven for 18 hours.

(2) A water solution of 10% by weight alkyl aryl polyethylene glycol ("Igepal" CO-630 sold by General Dyestuff Corp., New York, N.Y.) is used instead of full strength.

The blend disclosed in this invention exhibited no failures in more than 500 hours, using this modified ASTM stress crack resistance test after exposure to the Brabender conditioning described above.

A "rheology number" measures processibility. The smaller the rheology number at a given melt index the more processible a resin will be during extrusion. Rheology number is obtained by the use of a constant rate capillary rheometer; temperature, 190° C.; capillary—0.030 in. I.D.; 1 in. land; 90°—entrance angle. Rheology number is defined as the sum of the shear stress ($\tau w$) in p.s.i., at crosshead speeds of 2.0, 5.0 and 10.0 in./min. Shear stress at the capillary wall ($\tau w$) can be calculated as a function of the extrusion force, plunger diameter, capillary diameter and capillary length:

$$\tau w = \frac{(F)(d_c)}{(\pi)(L_c)(d_p)^2}$$

where
$\tau w$=shear stress, p.s.i.
F=force, lbs.
$d_p$=plunger diameter (0.375 in.)
$d_c$=diameter of capillary (0.030 in.)
$L_c$=length of capillary (1 in.)

Low temperature brittleness (L.T.B.) is meaused by ASTM D-746-64T at −76° C. This test measures the ability of a cable jacket to withstand severe impact at subzero temperatures. It is run on samples cut from a compression molded plaque. Ten samples of each blend are tested, and if more than 2 samples fail, the blend is unsatisfactory. The addition of ethylene/vinyl acetate copolymer may improve low temperature brittleness in a resin. Wax tends to increase test failures as the wax concentration increases.

In the following examples which illustrate but do not limit the scope of the invention, all parts and percentages are by weight unless otherwise specified.

EXAMPLE I

About 84.25 weight percent of ethylene homopolymer having a melt index of 0.2 and density of 0.918, 11.0 weight percent of an ethylene/vinyl acetate copolymer containing 28% vinyl acetate by weight of copolymer having a melt index of 15, and 2.0 weight percent of synthetic paraffin wax with a melting point of 52° C. designated Sunoco 3425 and commercially available from the Sun Oil Company, is blended together in a 2-inch, single screw extruder fitted with a mixing torpedo, at 240° C. melt temperature at a throughput of 50 pounds per hour. Other components are: 2.6 weight percent channel black having a particle size of 20 millimicrons, 0.1 weight percent antioxidant, 2,2′-thiobis(4-methyl - 6 - tert-butyl phenol), added for stabilization purposes, 0.05 weight percent tracer, added for identification purposes. The polymer blend is then placed in the cavity of a Brabender Plasticorder® and worked for two hours at a circulating oil bath temperature of 200° C. with the rotors set at 125 r.p.m. A 0.32 centimeter thick sheet is compression molded at 170° C.

The blend is tested and shows no failures in 10 samples after 500 hours of the stress crack resistance test described herein, rheology number of 154, and 0/10 (no failures in 10 samples) in the ASTM D-746 low temperature brittleness test.

Table I below summarizes testing of various blends keeping the amounts of carbon, antioxidant, and tracer in the blend constant at 2.75 weight percent and varying the precentage of the ethylene/vinyl acetate copolymer and wax components described in this example.

TABLE I

| Run Number | Wt. percent base polyethylene | Wt. percent EVA[a] | Wt. percent Sunoco 3425 Wax | Melt index of blend | Rheology Number | LTB −76° C. failures 10 samples | Brabender ESCR[b] failures of 10 samples total hours |
|---|---|---|---|---|---|---|---|
| 1 | 87.25 | 8.00 | 2.00 | 0.45 | 155 | 0/10 | 0/500 |
| 2 | 86.25 | 9.00 | 2.00 | 0.48 | 156 | 0/10 | 0/500 |
| 3 | 85.25 | 10.00 | 2.00 | 0.48 | 152 | 1/10 | 0/500 |
| 4[c] | 84.25 | 11.00 | 2.00 | 0.52 | 154 | 0/10 | 0/500 |
| 5 | 83.25 | 12.00 | 2.00 | 0.52 | 153 | 0/10 | 0/500 |

[a] 28% by weight vinyl acetate, MI=15.
[b] 200° C. oil bath temperature, 125 r.p.m. rotor speed, 2 hours.
[c] This is Example 1.

EXAMPLE II

The process of Example I is modified by blending on a two-roll mill at 160° C. for about 10 minutes instead of an extruder. Table II summarizes the blends made and tested. Again the amount of carbon, antioxidant, and tracer in the blend is held constant at 2.75 weight percent. The ethylene homopolymer has a density of 0.918 and a melt index of 0.2 dg./min.

TABLE II

| Run No. | Wt. percent base polyethylene | Wt. percent EVA[a] | Wt. percent Sunoco 3425 Wax | Melt index of blend, dg./min. | Rheology Number | LTB −76° C. failures/10 samples | Brabender ESCR[b] failures of 10 samples/total hour |
|---|---|---|---|---|---|---|---|
| 6 | 90.25 | 7 | 0 | 0.15 | 183 | | 10/24 |
| 7 | 89.25 | 8 | 0 | 0.18 | 185 | 0/10 | 10/97 |
| 8 | 88.25 | 9 | 0 | 0.18 | 180 | | 10/1 |
| 9 | 87.25 | 10 | 0 | 0.18 | 182 | 1/10 | 9/239 |
| 10 | 93.25 | 2.0 | 2.0 | 0.21 | 179 | 0/10 | 10/2 |
| 11 | 91.25 | 4.0 | 2.0 | 0.23 | 177 | 0/10 | 10/24 |
| 12 | 89.25 | 6.0 | 2.0 | 0.23 | 173 | 0/10 | 9/46 |
| 13 | 91.25 | 3.0 | 3.0 | 0.24 | 171 | | 10/8 |
| 14 | 85.25 | 7.0 | 5.0 | 0.33 | 153 | 0/10 | 0/486 |
| 15 | 79.25 | 12.0 | 6.0 | 0.43 | 138 | 3/10 | 0/486 |
| 16 | 84.25 | 11.0 | 2.0 | 0.28 | 161 | 0/10 | 0/500 |
| 17 | 82.25 | 11.0 | 4.0 | 0.41 | 120 | 2/10 | 0/96 |
| 18 | 80.25 | 11.0 | 6.0 | 0.45 | 96 | 2/10 | 0/96 |
| 19 | 78.25 | 11.0 | 8.0 | 0.64 | 88 | 4/10 | 0/96 |
| 20 | 76.25 | 11.0 | 10.0 | 0.89 | 82 | 5/10 | 0/245 |

[a] 28% vinyl acetate, MI=6.
[b] 200° C. oil bath temperature, 125 r.p.m. rotor speed, 2 hours.
NOTE.—Of runs 6-20, only 14, 16 and 17 are satisfactory cable coating compositions. All others failed with regard to one or more of the physical tests.

EXAMPLE III

Ethylene homopolymer having a melt index of 0.2 and a density of 0.918 is blended on a roll mill at 160° C. for about 10 minutes with ethylene/vinyl acetate copolymer and a carbon concentrate composed of carbon (channel black, 20 millimicron average particle size), the designated polyethylene, antioxidant, tracer, and a synthetic paraffin wax melting at 52° C. designated as Sunoco 3425 wax (where 2.0% by weight of wax is indicated in Table III). Several blends are made in this manner, varying the ethylene/vinyl acetate copolymer composition. All blends contain 0.1% by weight 4,4′-thiobis-(2-tert-butyl-5-methyl phenol). The blend compositions and properties are summarized in Table III below.

TABLE III

| Run Number | EVA copolymer Wt. percent VA content | EVA copolymer Wt. percent MI | Wt. percent EVA in blend | Wt. percent VA in blend | Wt. percent carbon black in blend [a] | Wt. percent Sunoco 3425 Wax in blend | Brabender ESCR [b] failures of 10 samples total hours | LTB −76° C. failures 10 samples | Rheology Number |
|---|---|---|---|---|---|---|---|---|---|
| 21 | 28 | 6 | 14.3 | 4 | 2.55 | 0.0 | 0/500 | 0/10 | 180 |
| 22 | 40 | 50 | 15.0 | 6.0 | 4.95 | 5.0 | 0/500 | 0/10 | 135 |
| 23 | 21.6 | 0.6 | 12.5 | 2.7 | 2.55 | 2.0 | 10/30 | 0/10 | 190 |
| 24 | 25 | 2.0 | 10.8 | 2.7 | 2.55 | 2.0 | 0/245 | 0/10 | 177 |
| 25 | 33 | 25 | 8.2 | 2.7 | 2.55 | 2.0 | 0/245 | 0/10 | 174 |
| 26 | 40 | 50 | 6.75 | 2.7 | 2.55 | 2.0 | 0/245 | 1/10 | 173 |

[a] Added as carbon concentrate. (See Example III).
[b] 200° C. oil bath temperature, 125 r.p.m. rotor speed, 2 hours.

NOTE.—Run 23 is an unsatisfactory cable coating composition as it fails the ESCR test and has a rheology number of 190.

EXAMPLE IV

Satisfactory blends may be obtained using ethylene-propylene copolymer containing up to about 2 mol percent propylene and having a melt index in the range of 0.1 to 1.0 dg./min. and a density in the range of 0.914 to 0.921, in place of the base resin illustrated in the satisfactory runs of the foregoing tables.

I claim:
1. A composition comprising:
   (a) an ethylene/vinyl acetate copolymer comprising 7% to 15% by weight of said composition, said copolymer having a vinyl acetate content of about 22% to 40% by weight, said ethylene/vinyl acetate copolymer having a melt index in the range of 0.2 to 60;
   (b) a synthetic paraffin wax comprising 2% to 4% by weight of said composition having a melting point of 40° C. to 70° C.;
   (c) a stabilizing amount of carbon black and a stabilizing amount of antioxidant;
   (d) a complemental amount of a polyethylene resin having a density in the range of 0.914 to 0.921 and a melt index in the range of 0.1 to 1.0; and
   (e) said composition having a melt index in the range of 0.2 to 1.0 and a density in the range of 0.929 to 0.942.

2. The composition of claim 1 wherein:
   (a) said polyethylene resin comprises 80% to 86% by weight of said composition;
   (b) said ethylene/vinyl acetate copolymer comprises 10% to 12% by weight of said composition; and
   (c) said synthetic paraffin wax has a melting point between 50° C. and 55° C.

3. The composition of claim 2 wherein said ethylene/vinyl acetate copolymer contains 25% to 35% vinyl acetate based on the weight of ethylene/vinyl acetate copolymer.

4. The composition of claim 2 wherein said composition has a melt index of 0.2 to 0.6 and a density of 0.936 to 0.942.

5. The composition of claim 2 wherein the carbon black is channel black having average particle size ranging from 15 to 25 millimicrons and is present in the composition in a concentration range of 2% to 3% by weight.

6. The composition of claim 5 wherein an anti-oxidant selected from the group consisting of 4,4′-thiobis-(2-tert-butyl - 5-methyl phenol), 2,2′-thiobis-(4-methyl - 6-tert-butyl phenol), and 1,1′-thiobis-2-naphthol is present in said composition in a concentration range of 0.05% to 0.20% by weight.

7. The composition of claim 1 wherein said polyethylene resin contains telogenic amounts of a telogen selected from the group consisting of methane, ethane, and propane.

8. The composition of claim 1 in which the polyethylene resin contains up to 2 mol percent propylene.

References Cited

UNITED STATES PATENTS

| 2,448,799 | 9/1948 | Happoldt et al. |
| 3,248,359 | 4/1966 | Maloney. |
| 3,382,298 | 5/1968 | Larsen et al. |
| 3,422,055 | 1/1969 | Maloney. |

FOREIGN PATENTS

| 1,360,451 | 3/1964 | France. |

MORRIS LIEBMAN, Primary Examiner

S. L. FOX, Assistant Examiner

U.S. Cl. X.R.
260—41, 897